United States Patent
Maloney et al.

(10) Patent No.: US 10,810,697 B2
(45) Date of Patent: Oct. 20, 2020

(54) CODE GENERATION SYSTEM FOR IMAGE CAPTURE DEVICE PARAMETERS

(71) Applicant: Disney Enterprises, Inc., Burbank, CA (US)

(72) Inventors: Michael Maloney, Woodland Hills, CA (US); Vince Cerundolo, Pasadena, CA (US); Steven Shapiro, Los Angeles, CA (US); Blake Sloan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/228,649

(22) Filed: Dec. 20, 2018

(65) Prior Publication Data
US 2020/0202477 A1 Jun. 25, 2020

(51) Int. Cl.
*G09G 5/00* (2006.01)
*G06T 1/20* (2006.01)
*H04N 5/232* (2006.01)
*G06T 1/60* (2006.01)

(52) U.S. Cl.
CPC .................. *G06T 1/20* (2013.01); *G06T 1/60* (2013.01); *H04N 5/23229* (2013.01); *G06T 2200/28* (2013.01)

(58) Field of Classification Search
CPC ...... G06F 16/583; G06F 40/20; G06F 16/164; G06F 16/48; G06F 16/58; G06F 16/5846; G06F 40/205; G06T 7/80
See application file for complete search history.

(56) References Cited

U.S. PATENT DOCUMENTS

| | | | | |
|---|---|---|---|---|
| 2005/0240391 A1* | 10/2005 | Lekutai | ................. | G06F 40/166 704/2 |
| 2014/0123299 A1* | 5/2014 | Jung | ....................... | G06F 21/60 726/26 |
| 2018/0370435 A1* | 12/2018 | Konno | ...................... | B60R 1/00 |

* cited by examiner

*Primary Examiner* — Hau H Nguyen
(74) *Attorney, Agent, or Firm* — Farjami & Farjami LLP (57) ABSTRACT

A process receives, with a processor, a plurality of image device properties corresponding to an image capture device. Further the process selects, with the processor, one or more of the plurality of image device properties based on one or more pipeline criteria. The pipeline criteria indicate one or more weights corresponding to the plurality of image device properties. Additionally, the process truncates, with the processor, the one or more selected image device properties to a predetermined number of characters based on a human readability factor. The human readability factor is provided by the one or more pipeline criteria. The process automatically generates, with the processor, a device parameter data structure by ordering the truncated one or more image device properties according to the one or more weights. Moreover, the process transmits, with the processor, the device parameter data structure through a video post-production pipeline.

18 Claims, 6 Drawing Sheets

CODE GENERATION SYSTEM FOR IMAGE CAPTURE DEVICE PARAMETERS

BACKGROUND

1. Field

This disclosure generally relates to the field of image capture devices.

2. General Background

Conventional video production environments often use more than one image capture device (e.g., camera) during production of video content (e.g., movies, television shows, video games, etc.). For example, filming some scenes may involve use of a smaller camera as opposed to a larger camera, a crash conducive camera as opposed to a non-crash conducive camera, etc. With scenery in video content becoming more elaborate, the number of cameras used on-set has also continued to increase. Yet, conventional configurations have not provided a meaningful or accurate way of determining, during post-production, which of the many cameras may have been used to film a particular scene in the video content on-set. As a result, such configurations do now allow collaborators (e.g., technicians, artists, supervisors, etc.) working in post-production to obtain an accurate representation of the image capture device parameters used to capture a particular scene.

SUMMARY

In one aspect, a computer program product comprises a non-transitory computer readable storage device having a computer readable program stored thereon. The computer readable program when executed on a computer causes the computer to receive, with a processor, a plurality of image device properties corresponding to an image capture device. Further, the computer is caused to select, with the processor, one or more of the plurality of image device properties based on one or more pipeline criteria. The pipeline criteria indicate one or more weights corresponding to the plurality of image device properties. In addition, the computer is caused to truncate, with the processor, the one or more selected image device properties to a predetermined number of characters based on a human readability factor. The human readability factor is provided by the one or more pipeline criteria.

Moreover, the computer is caused to automatically generate, with the processor, a device parameter data structure by ordering the truncated one or more image device properties according to the one or more weights. Further, the computer is caused to transmit, with the processor, the device parameter data structure through a video post-production pipeline to convey the selected one or more pipeline criteria for post-production of a scene captured by the image capture device.

In another aspect, a system has a database that stores a plurality of image device properties corresponding to an image capture device. Further, the system has a processor that performs the functionality of the computer readable program. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration is provided to generate a plurality of image capture device codes that each define one or more image capture device properties. Further, each of the image capture device codes may specify how the media captured by the corresponding image capture device is supposed to be processed through a post-production pipeline. The configuration may automatically generate the image capture device codes based on one or more pipeline criteria. In other words, the configuration may select, for encoding, which image capture device properties are the most pertinent to one or more parts of the post-production pipeline; whereas the less pertinent parts may be excluded from the encoding. Accordingly, the configuration generates self-contained, human readable codes that are understandable to collaborators working within a video production pipeline without having to perform a database lookup. Such collaborators may instantly determine what image capture device was used to perform image capture for a particular scene, the most pertinent device parameters for the corresponding part of the video production pipeline, and the way the particular scene was intended to be displayed.

Figure 1:
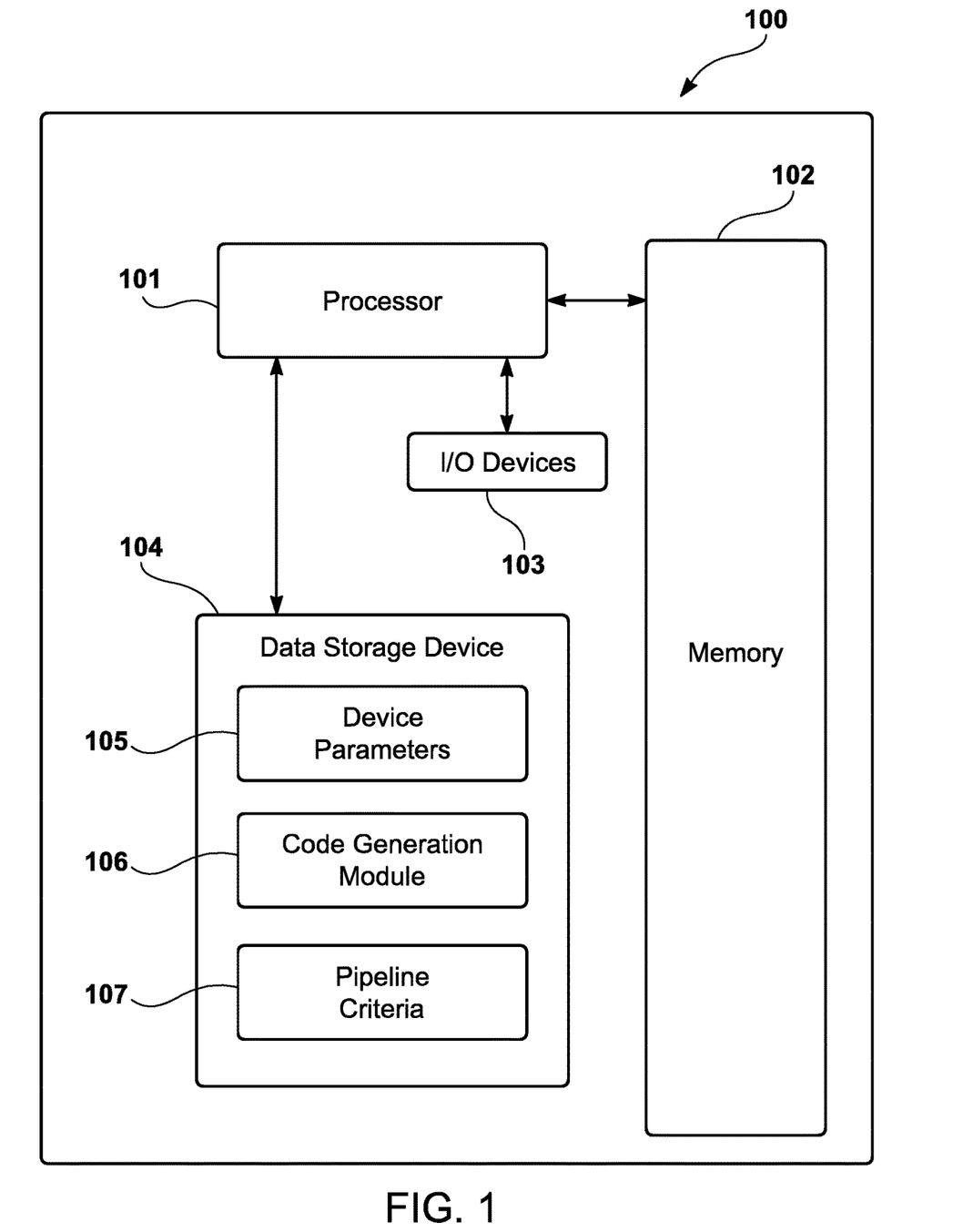
FIG. 1 illustrates the internal components of a device code generation system that may be used to generate a plurality of codes for one or more image capture devices.

FIG. 1 illustrates the internal components of a device code generation system 100 that may be used to generate a plurality of codes for one or more image capture devices. Further, the device code generation system 100 includes a processor 101, a memory device 102 (e.g., random access memory ("RAM") and/or read only memory ("ROM")), one or more input/output ("I/O") devices 103 (e.g., keyboard, mouse, pointing device, touch screen, microphone, etc.), and a data storage device 104.

The processor 101 receives, via the I/O devices 103, one or more device properties corresponding to an image capture device. For example, a human operator may input the properties (e.g., manufacturer, model, etc.) of a particular image capture device on-set prior to, during, or after the filming of a particular scene. Such properties may be stored as device parameters 105 on the data storage device 104. Alternatively, the device parameters 105 may be electronically transmitted, locally or remotely, to the data storage device 104 (e.g., via a data file).

Further, the processor 101 may execute a code generation module 106, which may be stored on the data storage device 104, to generate a plurality of image capture device codes based on the device parameters 105. The processor 101 may use one or more pipeline criteria 107, which may be predetermined and stored on the data storage device 104, to filter out the most meaningful device parameters from the inputted device parameters 105. Further, the processor 101 may truncate the filtered device parameters in a manner that would be most easily understood throughout the post-production pipeline, as indicated by the pipeline criteria 107. Finally, the processor 101 may order and concatenate the filtered and truncated codes into a string that emphasizes the priority, and human readability, of certain device parameters over others. For example, the pipeline criteria 107 may indicate, via one or more weights, that the manufacturer has a higher priority than the model number; accordingly, the processor 101 generates the manufacturer code to appear before the model number code in the string.

In one aspect, the processor 101 minimizes character count while maximizing semantic meaning to optimize the human readability, and comprehension, of the generated string. For example, the processor 101 may establish a limit on the character count to eight characters. (The example of eight is provided solely as an example since a variety of other characters counts may be established to also minimize character count and maximize semantic meaning.)

One or more of the code generation tasks described with respect to the processor 101 may be automatically performed by the processor 101. For example, the processor 101 may perform filtering, truncation, ordering, and/or concatenation without input from a human operator. Further, the processor 101 may automatically transmit the generated codes throughout various parts of a post-production pipeline to meaningfully convey the intended framing (i.e., image capture of objects in relation to others) of a scene filmed by a particular camera. For instance, the processor 101 may provide the generated codes as a burn-in (e.g., overlay display) for on-set monitoring or post-production editing. The processor 101 may also automatically generate metadata that includes the generated codes, and the processor 101 may then transmit the metadata to parts of the post-production pipeline for framing a scene.

Accordingly, the device code generation system 100 improves the functioning of a computer (e.g., the processor 101) by improving the accuracy of how video content is displayed. Although different scenes of video content may be captured with many different cameras, each possibly having different device parameters (e.g., aspect ratios, resolutions, etc.), the video content is ultimately displayed by a display device with one set of display parameters. In contrast with previous configurations that inaccurately displayed a final version of video content based on incomplete device parameter data, the device code generation system 100 captures, and transmits, the most pertinent device parameter data in a data structure (e.g., filtered, truncated, and ordered string) that allows for accurate framing throughout the post-production pipeline. The generated data structure is optimized, via rules such as the pipeline criteria 107, to avoid framing errors that may occur throughout the post-production pipeline. For example, the generated data structure removes the guesswork of which camera was used to film which shot, thereby allowing for the correct features of a camera (e.g., aspect ratio, resolution, etc.) to be used throughout the post-production pipeline to match the camera features with the corresponding display device that ultimately displays the video content.

Moreover, the generated data structure reduces the memory requirements of the memory device 102 illustrated in FIG. 1. Rather than transmitting all of the unfiltered data pertaining to an image capture device, the processor 101 is able to use less memory by transmitting a compact, filtered data structure rather than a file with all of the camera properties pertaining to a particular camera. In other words, the generated data structure allows for the functionality of the computer (e.g., processor 101) to be improved as a computing tool.

Figure 2:
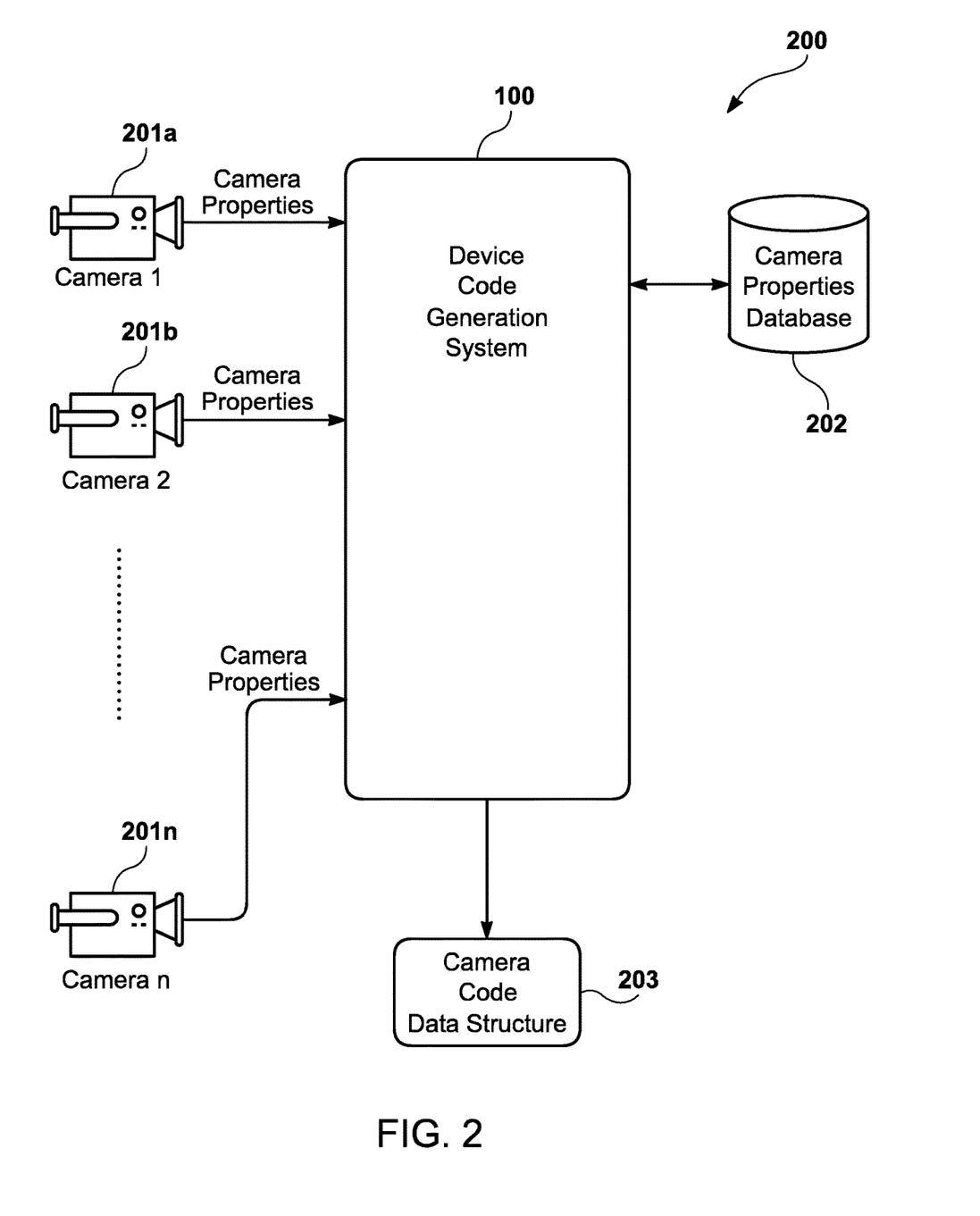
FIG. 2 illustrates an example of a camera configuration that uses the device code generation system illustrated in FIG. 1 to generate one or more camera codes.

FIG. 2 illustrates an example of a camera configuration 200 that uses the device code generation system 100 illustrated in FIG. 1 to generate one or more camera codes. For instance, a plurality of cameras 201*a-n* (e.g., cinema cameras) may be used on-set to film video content. (Although cameras are illustrated as examples, other types of image capture devices may be used instead.)

The camera properties (e.g., manufacturer, model, resolution, aperture, aspect ratio, etc.) specific to each of the cameras 201*a-n* may be provided to the device code generation system 100. In one aspect, such camera properties may be inputted to the device code generation system 100 via one of the I/O devices 103 illustrated in FIG. 1. In another aspect, the camera properties may be electronically transmitted, via a local or remote communication, to the device code generation system 100.

Further, the device code generation system 100 may store the camera properties in a camera properties database 202. For example, the device code generation system 100 may store the inputted, or transmitted, camera properties in an unfiltered form in the camera properties database 202. The device code generation system 100 may then use the processor 101 illustrated in FIG. 1 to generate camera codes, and a corresponding data structure, for each of the cameras. The device code generation system 100 may then transmit each camera code data structure 203 in conjunction with, or independently of, an associated image filmed by that particular camera. Alternatively, or additionally, the device code generation system 100 may transmit each camera code data structure 203 as a burn-in overlay that may be displayed over the associated image when viewed on an on-set camera, display device, etc.

In one aspect, the device code generation system 100 may also store the generated camera code data structures 203 in the camera properties database 202 for subsequent retrieval. In an alternative aspect, a different database may be used.

Figure 3:
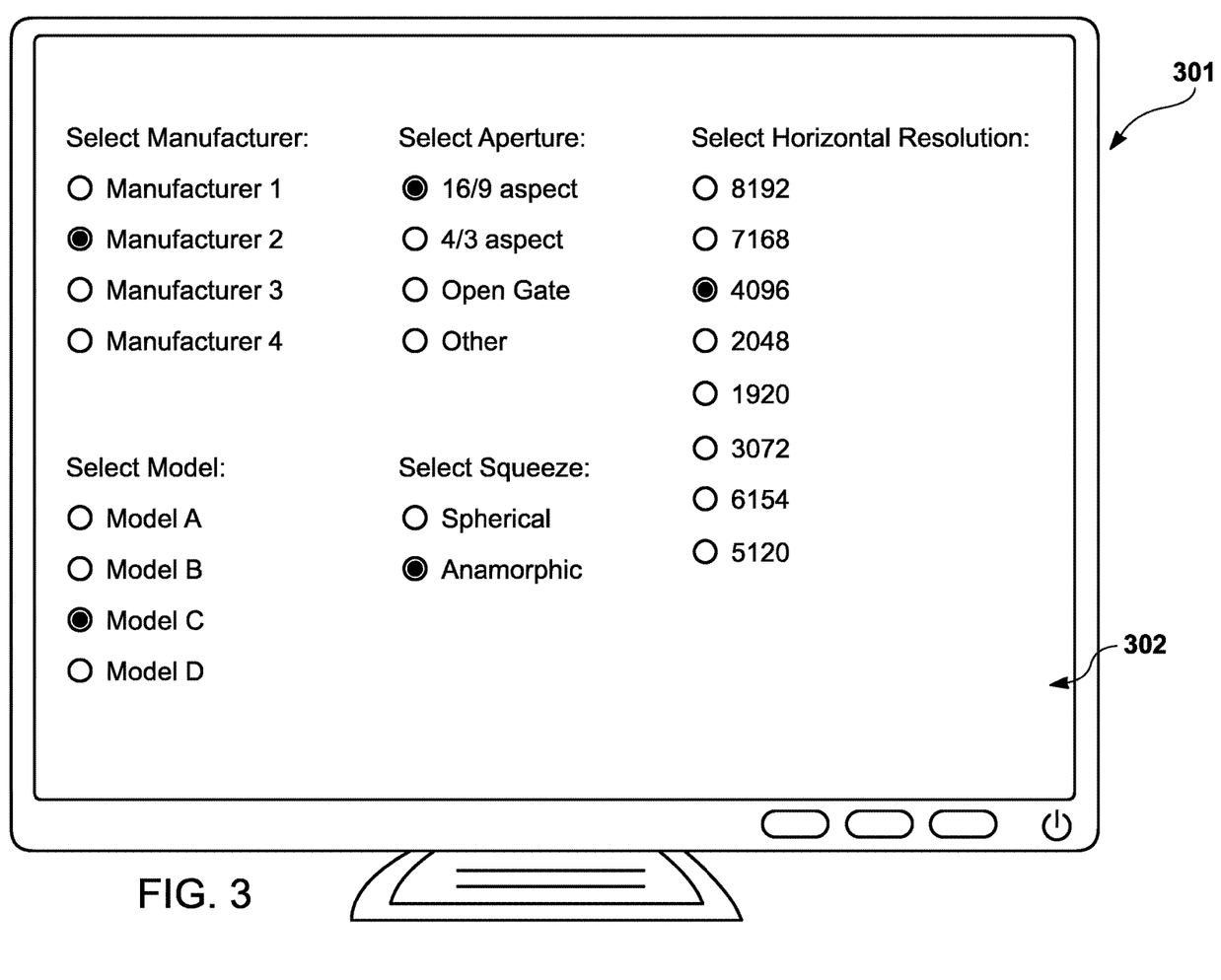
FIG. 3 illustrates an example of a display device that may be used to display a graphical user interface ("GUI") for inputting the camera parameters of the one or more of the plurality of cameras illustrated in FIG. 2.

Further, FIG. 3 illustrates an example of a display device 301 that may be used to display a GUI 302 for inputting the camera parameters of the one or more of the plurality of cameras 201*a-n* illustrated in FIG. 2. In one aspect, the processor 101 (FIG. 1) automatically interacts with a user through one or more menus to determine the camera parameters. For instance, the GUI 302 may provide menus (e.g., radio buttons, questions, etc.) to determine various camera properties for a particular camera. As an example, the GUI 302 is illustrated as displaying fields for camera properties such as manufacturer, model, aperture, squeeze, and horizontal resolution. (Other camera properties may be inputted in addition, or in the alternative.)

The device code generation system 100 (FIG. 1) may select the device parameters that are most pertinent to the particular units of the video post-production pipeline 400 (FIG. 4) to which the camera code data structure 203 is to be sent. For example, pipeline criteria may be established to ensure that the highest weights be assigned to the manufacturer and the model. Further, as another example, a significant weight may be assigned to the horizontal resolution as various units in the video post-production pipeline 400 may need to edit that particular camera property. Accordingly, the device code generation system 100 may filter which of the camera device parameters should be included in the camera code data structure 203, and exclude those with lower weights. A fixed length of the camera code data structure 203 may be established to ensure that only codes with the highest relative weights, which fit within the fixed length, may be allowed to be stored within the camera code data structure 203.

As an example, a fixed length of eight characters may be established. Further, with respect to FIG. 3, the manufacturer, model, resolution, and squeeze fields may have relatively high weights, whereas the aperture field may have a relatively low weight. Accordingly, the device code generation system 100 (FIG. 1) may filter out the aperture field, and leave the manufacturer, model, resolution, and squeeze fields for inclusion in the camera code data structure 203. Further, the device code generation system 100 may truncate the remaining device parameters in a manner that allows for the device parameters to all fit within the fixed length of the camera code data structure 203. For example, the device code generation system 100 may truncate the camera property selection of Manufacturer 2 to "M2," the camera property selection of Model C to "MC," the camera property selection of Resolution fourth thousand ninety six to "4K," and the camera property selection of Anamorphic Squeeze to "A2." The device code generation system 100 may generate such abbreviations based on a human readability factor, which may be predetermined to establish what codes are most easily understood by collaborators in the video post-production pipeline 400 (FIG. 4).

Figure 4:
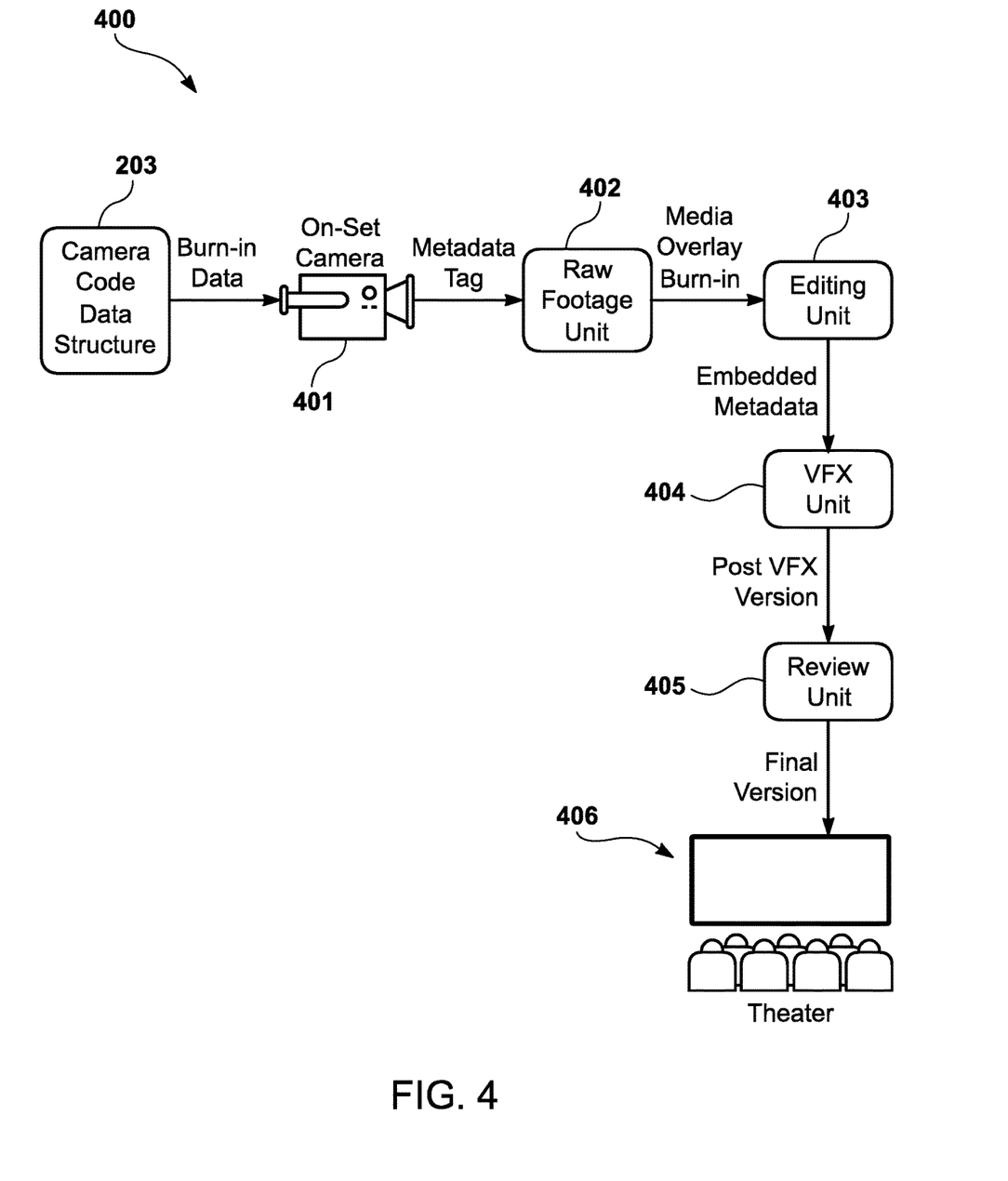
FIG. 4 illustrates a video post-production pipeline that receives the camera parameter data structure illustrated in FIG. 2.

Finally, the device code generation system 100 may order the resulting codes in a manner that prioritizes data comprehension for the collaborators in the video post-production pipeline 400 (FIG. 4). For example, the weights provided by the pipeline criteria may indicate the relative importance of various codes, which may then be used for ordering the codes, according to relative weights, within the camera code data structure 203. For example, the camera code data structure 203 may be represented as the following string: "M2MC4KA2." In one aspect, the camera code data structure 203 is uniquely generated so that each camera code data structure 203 uniquely identifies a particular type of camera and camera properties.

After generating the camera parameter data structure 203 illustrated in FIG. 2 based on the camera parameters inputted via the GUI 302 illustrated in FIG. 3, the device code generation system 100 illustrated in FIG. 1 may send the camera code data structure 203 to video post-production pipeline 400, as illustrated by FIG. 4. For example, the camera code data structure 203 may be sent as burn-in data (e.g., via an overlay) to an on-set camera 401 that is filming the video content. Accordingly, the particular camera code data structure 203 for the on-set camera 401 (FIG. 2) may be viewed during filming a scene of the video content.

Further, the on-set camera 401, or a computing system associated therewith, may send a metadata tag, which includes the camera code data structure 203, to a raw footage unit 402 of the video post-production pipeline 400. Moreover, a media overlay may be generated as a burn-in to the filmed scene, and forwarded to an editing unit 403 of the video post-production pipeline 400. After performing any editing on the filmed scene, the editing unit 403 may embed the metadata tag as embedded metadata. The editing unit 403 may then forward the embedded metadata to a visual effects ("VFX") unit 404 for off-site imagery manipulation. In addition, the VFX unit 404 may send a post-VFX version of the filmed scene to a review unit 405, which reviews the post-production work prior to delivery to a display environment 406 such as a theater. (Other, or different, units than those illustrated in the example of the video post-production pipeline 400 may be used.)

Throughout the video post-production pipeline 400, the camera code data structure 203 may provide information to various collaborators as to the camera properties used to film a particular scene. As a result, various collaborators may edit/manipulate (e.g., crop, change aspect ratio, etc.) the filmed scenery in a manner that optimizes the parameters particular to the various cameras 201*a-n* (FIG. 2) in a manner consistent with the features of the display environment 406. For example, a movie theater screen in a particular display environment may have a particular aspect ratio. The video post-production pipeline 400 may edit/manipulate the filmed scene to match, or match as close as possible to, the features/capabilities of the display screen in the display environment 406.

Figure 5:
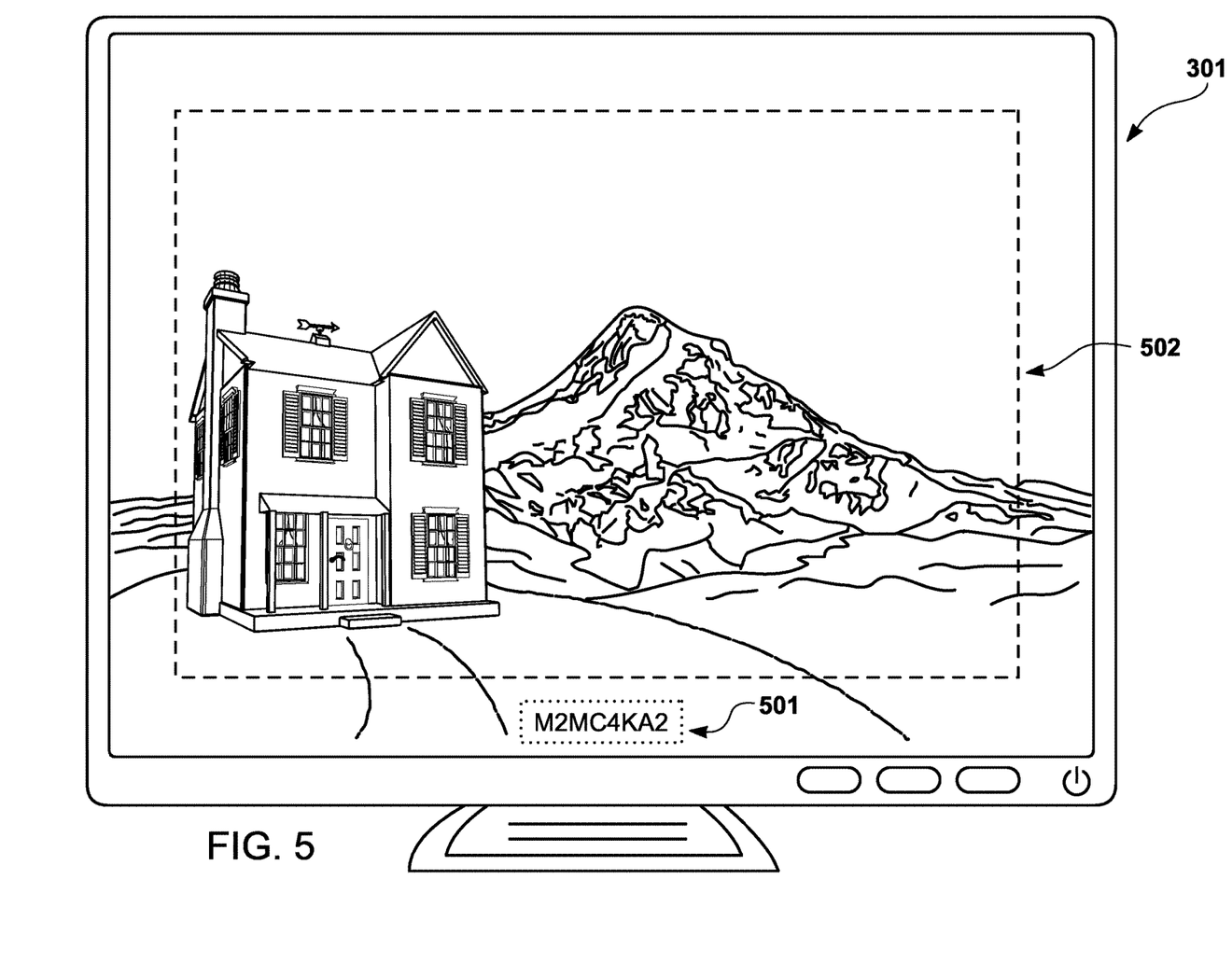
FIG. 5 illustrates an example of a display device displaying an image of a scene filmed by one of the cameras illustrated in FIG. 2, along with a burn-in overlay of the camera code data structure generated via the camera properties displayed in FIG. 3.

FIG. 5 illustrates an example of a display device 301 displaying an image 502 of a scene filmed by one of the cameras 201*a-n* illustrated in FIG. 2, along with a burn-in overlay 501 of the camera code data structure 203. Accordingly, various collaborators in the video post-production pipeline 400 may view the image 502 and determine how the image 502 was filmed based on the particular on-set camera 401 (FIG. 4) that performed the filming. As a result, such collaborators may view the camera code data structure 203 in the burn-in overlay 501 and edit/manipulate the image 502 based on the camera code data structure 203. For example, the camera code data structure 203 may indicate that a particular aspect ratio was used during filming, but that a cushion of additional room around the filmed image exists for expansion to a larger aspect ratio. As another example, the camera code data structure 203 may indicate the particular resolution that was used during filming, which allows for subsequent changes to conform to the resolution displayed by a display device in the display environment 406 (e.g., movie theater) illustrated in FIG. 4.

Figure 6:
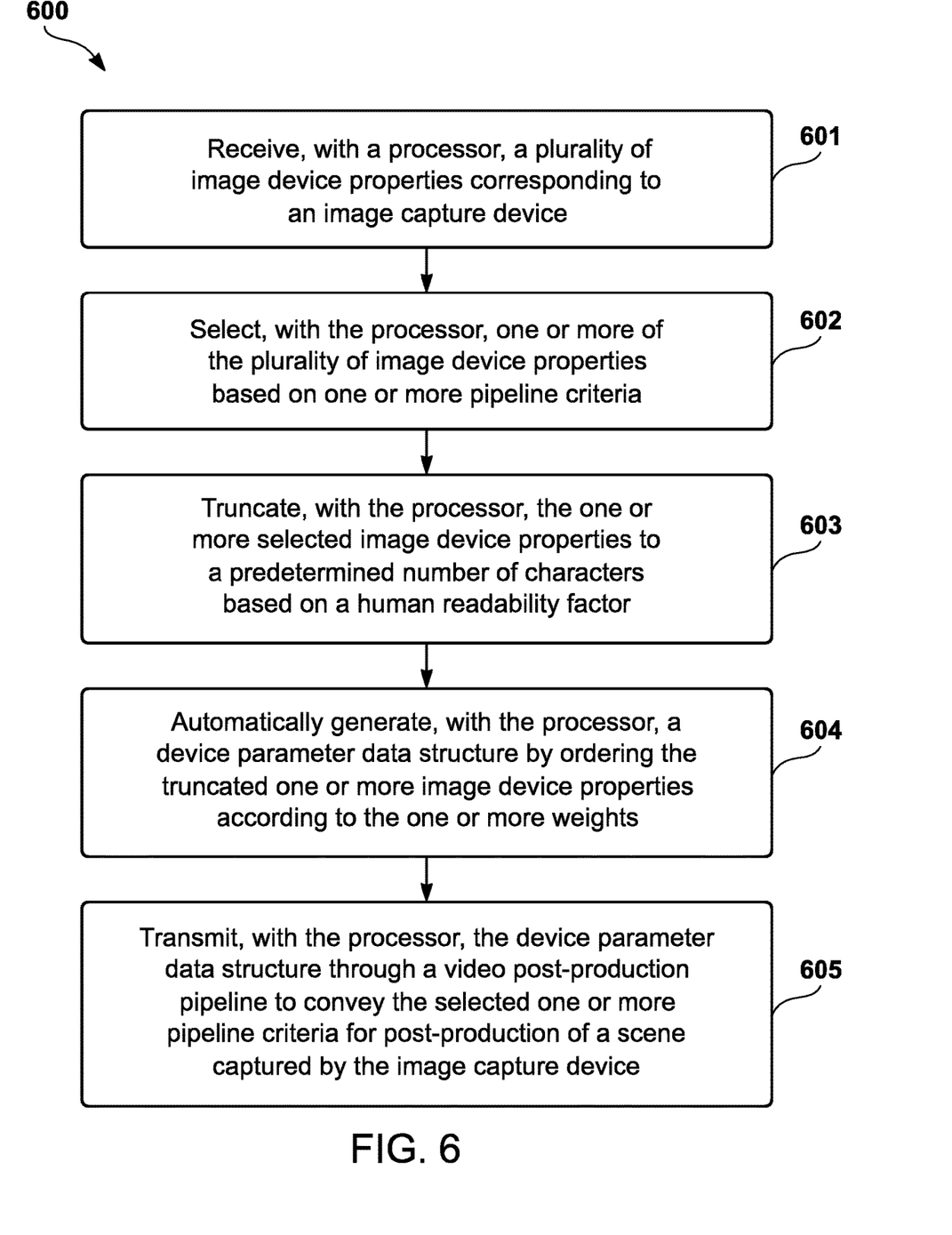
FIG. 6 illustrates a process that may be used by the device code generation system illustrated in FIG. 2 to generate a device parameter data structure such as the camera code data structure.

FIG. 6 illustrates a process 600 that may be used by the device code generation system 100 illustrated in FIG. 2 to generate a device parameter data structure, such as the camera code data structure 203. At a process block 601, the process 600 receives, with the processor 101, a plurality of image device properties corresponding to an image capture device. Further, at a process block 602, the process 600 selects, with the processor 101, one or more of the plurality of image device properties based on one or more pipeline criteria. The pipeline criteria indicate one or more weights corresponding to the plurality of image device properties. In addition, at a process block 603, the process 600 truncates, with the processor 101, the one or more selected image device properties to a predetermined number of characters based on a human readability factor. The human readability factor may be provided by the one or more pipeline criteria. Moreover, at a process block 604, the process 600 automatically generates, with the processor 101, a device parameter data structure by ordering the truncated one or more image device properties according to the one or more weights. Finally, at a process block 604 transmits, with the processor 101, the device parameter data structure through the video post-production pipeline 400 (FIG. 4) to convey the selected one or more pipeline criteria for post-production of a scene captured by the image capture device.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:
   receive, with a processor, image device properties corresponding to an image capture device, wherein the image device properties include at least one of manufacturer, model, resolution, pixel aspect, extraction, aperture, or squeeze;
   select, with the processor, a plurality of the image device properties based on a plurality of pipeline criteria, the pipeline criteria indicating a plurality of weights corresponding to the plurality of the image device properties;
   truncate, with the processor, the selected plurality of the image device properties to a predetermined number of characters;
   automatically generate, with the processor, a device parameter data structure by ordering the truncated plurality of the image device properties according to the plurality of weights; and
   transmit, with the processor, the device parameter data structure through a video post-production pipeline to convey the plurality of pipeline criteria for post-production of a scene captured by the image capture device.

2. The computer program product of claim 1, wherein the device parameter data structure uniquely identifies the image capture device and the selected plurality of the image device properties.

3. The computer program product of claim 1, wherein the computer is further caused to generate burn-in data that displays the device parameter data structure on an additional image capture device.

4. The computer program product of claim 1, wherein the computer is further caused to generate burn-in data that displays the device parameter data structure on a display device, the display device being distinct from the image capture device.

5. The computer program product of claim 1, wherein the computer is further caused to generate metadata comprising the device parameter data structure.

6. The computer program product of claim 5, wherein the computer is further caused to transmit the metadata with an image captured by the image capture device through the video post-production pipeline.

7. The computer program product of claim 1, wherein the computer is further caused to generate the device parameter data structure by maximizing semantic meaning according to the plurality of pipeline criteria.

8. The computer program product of claim 1, wherein the device parameter data structure conveys framing data through the video post-production pipeline.

9. The computer program product of claim 1, wherein the image capture device is a camera.

10. A method comprising:
    receiving, with a processor, image device properties corresponding to an image capture device, wherein the image device properties include at least one of manufacturer, model, resolution, pixel aspect, extraction, aperture, or squeeze;
    selecting, with the processor, a plurality of the image device properties based on a plurality of pipeline criteria, the pipeline criteria indicating a plurality of weights corresponding to the plurality of the image device properties;
    truncating, with the processor, the selected plurality of the image device properties to a predetermined number of characters;
    automatically generating, with the processor, a device parameter data structure by ordering the truncated plurality of the image device properties according to the plurality of weights; and
    transmitting, with the processor, the device parameter data structure through a video post-production pipeline to convey the plurality of pipeline criteria for post-production of a scene captured by the image capture device.

11. The method of claim 10, wherein the device parameter data structure uniquely identifies the image capture device and the selected plurality of the image device properties.

12. The method of claim 10, further comprising generating burn-in data that displays the device parameter data structure on an additional image capture device.

13. The method of claim 10, further comprising generating burn-in data that displays the device parameter data structure on a display device, the display device being distinct from the image capture device.

14. The method of claim 10, further comprising generating metadata comprising the device parameter data structure.

15. The method of claim 14, further comprising transmitting the metadata with an image captured by the image capture device through the video post-production pipeline.

16. The method of claim 10, further comprising generating the device parameter data structure by maximizing semantic meaning according to the plurality of pipeline criteria.

17. The method of claim 10, wherein the device parameter data structure conveys framing data through the video post-production pipeline.

18. A system comprising:
a database that stores image device properties corresponding to an image capture device, wherein the image device properties include at least one of manufacturer, model, resolution, pixel aspect, extraction, aperture, or squeeze; and
a processor that:
selects a plurality of the image device properties based on a plurality of pipeline criteria,
truncates the selected plurality of the image device properties to a predetermined number of characters,
automatically generates a device parameter data structure by ordering the truncated plurality of the image device properties according to the plurality of weights, and
transmits the device parameter data structure through a video post-production pipeline to convey the plurality of pipeline criteria for post-production of a scene captured by the image capture device, the plurality of pipeline criteria indicating the plurality of weights corresponding to the plurality of the image device properties.

\* \* \* \* \*